Jan. 1, 1963         C. V. DYE         3,071,392
TRAILER AXLE SPRING SUSPENSION
Filed Aug. 5, 1960         2 Sheets-Sheet 1
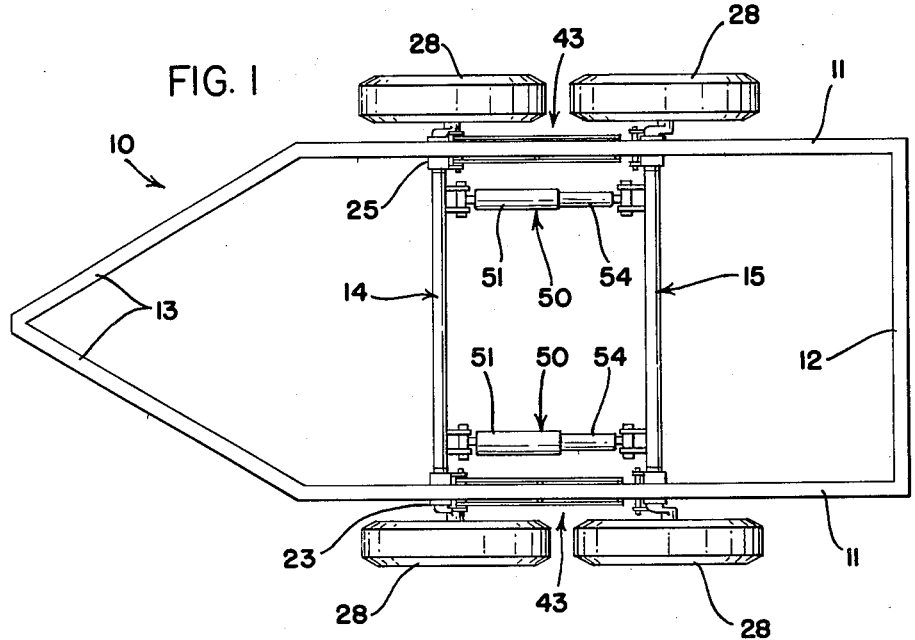
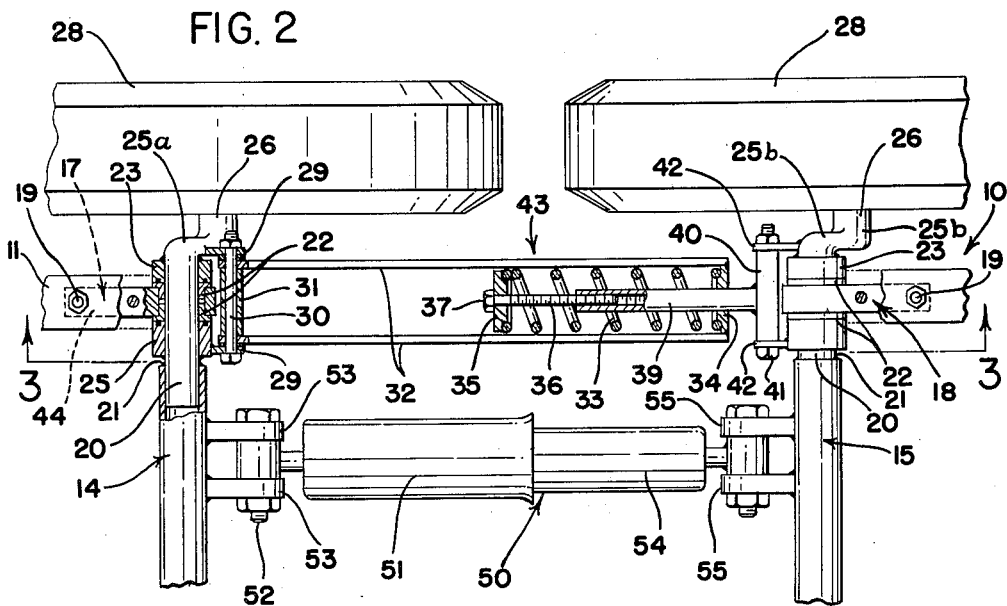
*INVENTOR.*
CLYDE V. DYE
BY *Ely, Frye & Hamilton*
ATTORNEYS Jan. 1, 1963             C. V. DYE             3,071,392
TRAILER AXLE SPRING SUSPENSION
Filed Aug. 5, 1960                          2 Sheets-Sheet 2
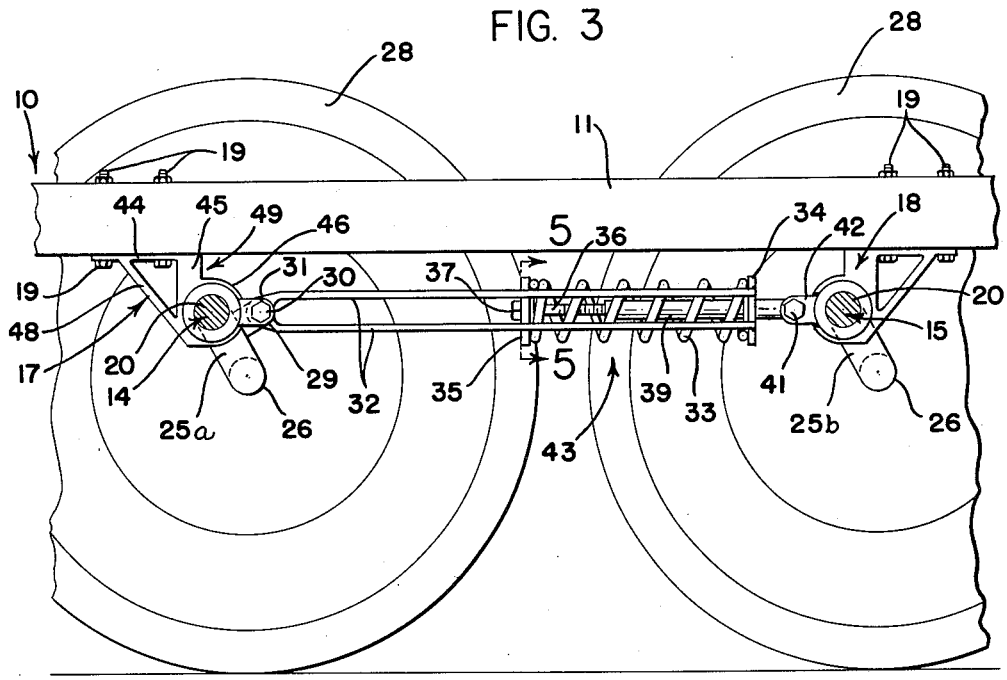
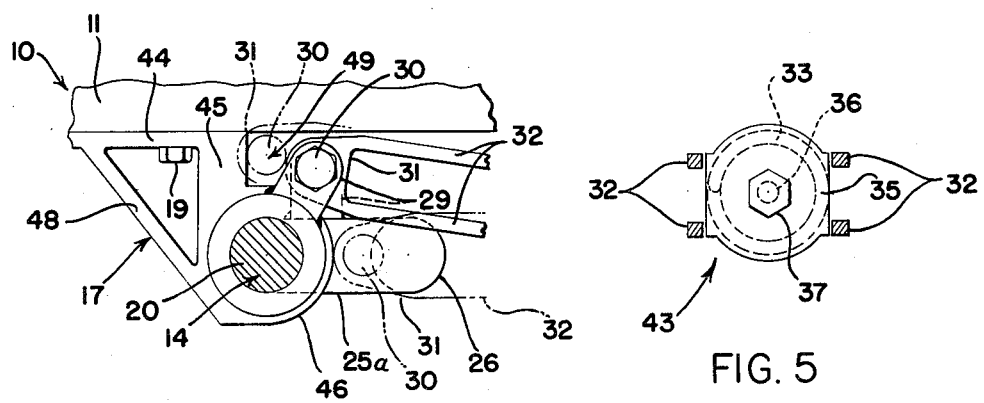
*INVENTOR.*
CLYDE V. DYE
BY *Ely, Frye & Hamilton*
ATTORNEYS

United States Patent Office 3,071,392
Patented Jan. 1, 1963

3,071,392
TRAILER AXLE SPRING SUSPENSION
Clyde V. Dye, 436 Wildwood Ave., Akron 20, Ohio
Filed Aug. 5, 1960, Ser. No. 47,775
4 Claims. (Cl. 280—104.5)

The invention relates generally to a spring suspension for trailer vehicles and more particularly to a spring suspension especially adapted for tandem axle trailers for transporting shifting loads.

Certain prior constructions of this type have been unduly complicated and expensive and have lacked stability in transporting unequal or shifting loads. Furthermore, those prior constructions in which spring and linkage systems interconnected tandem axles for equal load distribution have required that the axles be oriented such that one receives a greater shock load from the impact of its wheels against the road than does the other.

As applied to a trailer, the present construction is simple and compact, provides a stable frame with a low bed, which remains level in spite of unequal loading, and equally distributes the load to both axles.

Other objects include providing a tandem wheel suspension for a trailer which prevents swaying or weaving of the trailer due to shifting loads, which receives impacts equally on both axles, which transmits impacts on any one wheel equally to the others, and which provides firm and limited springing and damps backlash.

A further object is to provide a construction which permits operation of the trailer with one or a pair of wheels temporarily removed. These and other objects are accomplished by the improvements comprising the present invention, a preferred embodiment of which is shown by way of example in the accompanying drawings, and described in detail in the following specification. Various modifications and changes in construction are comprehended within the scope of the invention as defined in the appended claims.

Referring to the drawings:

FIG. 1 is a plan view of a relatively small trailer vehicle embodying the invention;

FIG. 2 is an enlarged fragmentary plan view thereof, partly broken away and in section;

FIG. 3 is a section on line 3—3 of FIG. 2;

FIG. 4 is a further enlarged fragmentary area of FIG. 3 shown in an alternate position; and FIG. 5 is an enlarged fragmentary transverse section on line 5—5 of FIG. 3.

The frame of the trailer is indicated generally at 10, and preferably includes laterally spaced longitudinal members 11 connected at their rear ends by a transverse member 12 and connected at their front ends by converging members 13. The members 13 form a V at the front end of the vehicle to which a suitable hitch may be attached to connect the trailer to the towing vehicle. The bed of the trailer is supported directly on the frame members.

The embodiment of the invention illustrated in FIGS. 1-5 has tandem axles 14 and 15, front and rear, respectively mounted in opposed pairs of brackets 17 and 18 secured on the undersides of the frame members 11 by bolts 19. Preferably, as shown in FIG. 2, the axles 14 and 15 comprises steel tubes extending transversely between the bearing brackets 17 and 18.

Stub shafts 20 are non-rotatively secured within the ends of the axle tubes 14 and 15, as by welding 21, and are journaled in flanged sleeve bearings 22 axially maintained by collars 23 secured to stub shafts 20 on both sides of bearings 22, as by welding. The stub shafts 20 have outer crank arms 25a and 25b which terminate at their outer ends in spindles 26 on which wheels 28 equipped with conventional pneumatic tires are mounted, the wheels being journaled on the spindles in a suitable and well-known manner.

The front axle 14 has lever arms in the form of pairs of bracket ears 29 attached thereto adjacent its ends so as to straddle the respective brackets 17 and 18, as by welding, with the ears extending rearwardly toward shaft 15. Pivotally mounted between each pair of ears 29 by a bolt 30 is the bored stirrup-shaped end 31 of merged bars 32 which form a framework around helical spring 33. A plate 34 is secured to the rear ends of bars 32 against which spring 33 can abut.

The other end of each spring 33 abuts a plate 35 slidable axially of the framework formed by bars 32. A rod 36 passes through and engages plate 35 with the head 37 on one end. The other end is threaded and is adjustably screwed into one end of a coupling pin 39, also encircled by spring 33. Pin 39 extends slidably through plate 34 and is secured to a transverse sleeve 40 pivotally mounted, as by bolt 41, between a pair of lever arms in the form of bracket ears 42, which extend forwordly from axle 15. The ears 42 are centered in longitudinal alignment with the respective front bracket ears 29 so that the spring assemblies, designated generally by the numeral 43, extend substantially longitudinally of the vehicle. Pivot bolts 30 and 41 are preferably substantially horizontally aligned to position the spring assemblies 43 horizontally. The construction and mounting of the springs between the two axles provides for a relatively low trailer bed.

As viewed in FIG. 3, when the frame is subjected to a load the shafts 14 and 15 move vertically downward imparting torque to the crank arms 25a and 25b in a counterclockwise direction. This torque tends to cause the spindles 26 to swing upwardly about the axle of their shafts 20 as centers. This upward swing does not effect the disposition of the wheels 28 with respect to each other.

Counterclockwise rotation of the crank arm 25a due to vertically downward movement of the front axle 14 or to upward movement of the front wheels, causes axial rotation of the front stub shafts 20 and counterclockwise rotation of the lever arms 29, exerting a forward pull on the plates 34 and compressing the springs 33.

As best shown in FIGS. 3 and 4, angle bracket 17 has a mounting leg 44 through which bolts 19 are secured to frame member 11. Journal mounting leg 45 depends perpendicularly from leg 44 downwardly from frame 11 terminating in journal box 46 extending outwardly of bracket 17 in an opposite direction from leg 44; a knee brace 48 may be provided between legs 44 and 45 to improve structural rigidity. A recess 49 is defined between frame member 11 and journal box 46 into which the stirrup end 31 of merged bars 32 may be swingingly received, as shown by the one solid and two phantom representations in FIG. 4.

Counterclockwise rotation of the crank arms 25b due to vertically downward movement of the rear axle 15 or upward movement of the rear wheels, causes axial rotation of the rear stub shafts 20 and counterclockwise rotation of the lever arms 42, exerting a rearward pull on the plates 35 and compressing the springs.

Accordingly, when any individual wheel, or the front or rear wheels, strikes a bump, the impact is distributed through the springs to all the wheels while being at least partially absorbed by the springs. Similarly, if the load on the trailer is unequal or shifts in transit, the unequal loading is absorbed through the springs by all the wheels. Furthermore, by trailing both crank arms 25a and 25b from their journaled centers of rotation in respective bracket pairs 17 and 18 the impact imparted to the wheels from the roadbed is compensated solely by rotation of the shafts 20, as described and does not subject the shafts 20 to severe compressive loading in the radial section of the crank arms 25a or 25b as it would be either of the crank arms were leadingly disposed. Moreover, the vehicle can be run in case of emergency with one wheel removed, or even with either the front or rear wheels both removed.

In operation, the connecting rods 36 are adjusted in the coupling pins 39 to pre-compress the springs 33 under the normal loads for which the trailer is designed. This insures a firm and limited springing action under all conditions and helps to level and stabilize the entire suspension assembly, as well as minimize backlash. The connecting rod 36 and the framework bars 32 of each spring assembly 43 constitute telescoping or overlapping means for compressing the spring 33 in response to movement of any wheel relative to the frame.

As a further means to absorb backlash, shock absorbers 50 may be provided between the axles 14 and 15. As best shown in FIG. 2, the shock absorbers may each comprise a front cylinder 51 pivoted at its front end by a bolt 52 to a pair of bracket ears 53 on axle 14 and a rear cylinder 54 telescopically slidable in the cylinder 51 and pivoted at its rear end in a pair of bracket ears 55. Movement of the cylinders 51 and 54 toward each other is yieldingly resisted by suitable and well-known fluid or spring means within the cylinders.

Hence, when springs 33 have compressed, as by an impact, and are suddenly released, the backlash will be absorbed or dampened by the shock absorbers 50.

Accordingly, unequal loads or impacts to the individual wheels are distributed to and absorbed by both springs.

It will be apparent from this foregoing description that the present invention provides a simple and inexpensive spring suspension for trailers having the advantage of a low bed, which is maintained level and stable under varying transporting conditions. The improved construction is especially adapted for transporting unequal and shifting loads, absorbing road shock to either axle with equal facility, and in case of tandem axles enables operation with one pair of wheels removed. The springing action is firm and limited, and unequal or shock loads are distributed to both axles and all wheels.

What is claimed is:

1. A trailer axle suspension comprising, a frame, opposed pairs of angle brackets, a mounting leg on each angle bracket attached to said frame, a journal support leg on each bracket extending downwardly from said frame, a journal box attached to each of the journal support legs downwardly from said frame and oppositely of said mounting leg, a pair of longitudinally spaced axles rotatably mounted in said journal boxes having crank arms rigidly connected to their outer ends, wheels journaled on said crank arms, lever arms in the form of bracket ears straddling said journals and extending substantially toward each other, compression spring means between said axles extending longitudinally of said frame, and means connected to the bracket ears of both axles for compressing said spring means in response to relative movement of the frame and the wheel on either of said axles.

2. A trailer axle suspension comprising, a frame, opposed pairs of angle brackets, a mounting leg on each angle bracket attached to said frame, a journal support leg on each bracket extending downwardly from said frame, a journal box attached to each of the journal support legs downwardly from said frame and oppositely of said mounting leg, a pair of longitudinally spaced axles rotatably mounted in said journal boxes having trailing crank arms rigidly connected to their outer ends, wheels journaled on said crank arms, lever arms in the form of bracket ears straddling said journals and extending substantially toward each other, compression spring means between said axles longitudinally of said frame, and means connected to the bracket ears of both axles for compressing said spring means in response to relative movement of the frame and the wheel on either of said axles, the juncture of said connection means and said bracket ears on at least one of said axles adapted to be rotated between said journal and said frame.

3. A trailer axle suspension comprising, a frame, opposed pairs of angle brackets, a mounting leg on each angle bracket attached to said frame, a journal support leg on each bracket extending downwardly from said frame, a journal box attached to each of the journal support legs downwardly from said frame and oppositely of said mounting leg, a pair of longitudinally spaced axles rotatably mounted in said journal boxes having trailing crank arms rigidly connected to their outer ends, wheels journaled on said crank arms, lever arms in the form of bracket ears straddling said journals and extending substantially toward each other, compression spring means between said axles extending longitudinally of said frame, means connected to the bracket ears of both axles for compressing said spring means in response to relative movement of the frame and the wheel on either of said axles, the juncture of said connection means and said bracket ears on at least one of said axles adapted to be rotated between said journal and said frame, and means to adjust the initial compression of said spring.

4. A trailer axle suspension system comprising, a frame having longitudinal side members, opposed pairs of angle brackets attached to and extending downwardly from said side members, a pair of horizontally spaced axles journaled in said angle brackets downwardly of said frame, the ends of each axle outwardly of said angle brackets being formed as trailing crank arms extending rearwardly of said angle brackets for mounting vehicle wheels, two sets of opposed lever arms in the form of bracket ears rigidly connected to each axle, each set straddling one of said brackets, said crank arms being inclined downwardly of said side members when the lever arms are parallel to said side members, compression spring means located between each set of opposed lever arms and substantially parallel to said side members, and means for connecting each set of lever arms to one spring means for compression thereof in response to loading of said frame.

References Cited in the file of this patent

FOREIGN PATENTS

| 608,558 | France | Apr. 24, 1926 |
| 969,106 | France | May 17, 1950 |

UNITED STATES PATENT OFFICE
CERTIFICATE OF CORRECTION

Patent No. 3,071,392                          January 1, 1963

Clyde V. Dye

It is hereby certified that error appears in the above numbered patent requiring correction and that the said Letters Patent should read as corrected below.

Column 1, line 64, for "comprises" read -- comprise --; column 2, line 39, for "arm" read -- arms --; column 3, line 3, for "be" read -- if --; column 4, line 12, after "axles" insert -- extending --.

Signed and sealed this 7th day of January 1964.

(SEAL)
Attest:

ERNEST W. SWIDER

Attesting Officer

EDWIN L. REYNOLDS

Acting Commissioner of Patents